(12) United States Patent
Szatkowski et al.

(10) Patent No.: US 6,416,435 B1
(45) Date of Patent: Jul. 9, 2002

(54) BELT TENSIONER

(75) Inventors: Antoni Szatkowski, Macomb; Zdravko Dobrasevic; John P Matterazzo, both of Warren, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/587,167

(22) Filed: Jun. 2, 2000

(51) Int. Cl.[7] .................................................. F16H 7/12
(52) U.S. Cl. .......................... 474/112; 474/135; 192/47
(58) Field of Search ................................ 474/112, 133, 474/135; 192/47, 45; 188/82.3

(56) References Cited

U.S. PATENT DOCUMENTS

| | | | |
|---|---|---|---|
| 4,392,840 A | * | 7/1983 | Radocaj |
| 4,923,435 A | * | 5/1990 | Kadota et al. ............... 474/112 |
| 5,073,148 A | | 12/1991 | Dec ............................. 474/94 |
| 5,328,415 A | | 7/1994 | Furutani et al. ............. 474/112 |
| 5,423,304 A | | 6/1995 | Lawrence et al. ........ 123/559.1 |
| 5,425,345 A | | 6/1995 | Lawrence et al. ........ 123/559.1 |
| 5,873,799 A | | 2/1999 | Meckstroth ................. 474/135 |
| 5,924,947 A | | 7/1999 | Williams .................... 474/133 |

* cited by examiner

Primary Examiner—Mary Ann Green

(57) ABSTRACT

A belt tensioner for automatically tightening a belt of a motor vehicle. The belt tensioner includes a tensioner mechanism including a hub, an inner casing and an outer casing. The outer casing is movably mounted to the inner casing. The hub is freely mounted for rotation to the outer casing and for contacting the belt and selectively tightening and loosening the belt in response to movement of the outer casing relative to the inner casing in first and second directions, respectively. The belt tensioner further includes a biasing mechanism for providing a torque force to the outer casing in the first direction. The belt tensioner additionally includes a one-way clutch mechanism normally resisting movement of the outer casing relative to the inner casing in the second direction. An exteriorly accessible rotatably member is associated with the one-way clutch mechanism for selectively deactivating the one-way clutch mechanism to prevent movement of the inner casing in the second direction.

7 Claims, 3 Drawing Sheets

BELT TENSIONER

BACKGROUND OF THE INVENTION

1. Field of the Invention

The present invention generally pertains to motor vehicles. More particular, the present invention pertains to an automatic belt tensioner for a motor vehicle.

2. Discussion

Conventional motor vehicles are provided with belts for rotatably connecting various components. In a first example, various motor vehicle accessories are powered by a continuous drive belt which is driven by an engine crankshaft through a crankshaft pulley. In a second example, a timing belt is used to synchronize engine timing and rotatably connect an engine crankshaft and cam shaft sprockets. Proper vehicle operation requires the maintenance of adequate tension in such drive belts and timing belts.

Tensioners are used to maintain proper tensioning of the drive and timing belts. Conventional tensioners include two types—manual and automatic. Manual accessory belt tensioners require user action to maintain proper tension throughout the life of a belt. Automatic accessory belt tensioners typically are biased into engagement with the belt for maintaining the belt under tension.

A typical automatic belt tensioner includes a tension arm pivotally mounted on a hub. A tension pulley is rotatably attached to a free end of the tension arm. A compression coil spring biases the pulley into engagement with the belt to thereby reduce the vibration of the belt by tensioning.

Under operating conditions, when the variable load of the belt creates a force on the coil spring greater in magnitude than the biasing force of the coil spring, the pulley is displaced from its biased position against the bias of the coil spring. When the variable load of the belt subsequently falls, the belt is momentarily slackened until the coil spring can respond. This slackening of the belt often results in undesirable noise and vibrations.

Various embodiments of a belt tensioner which automatically maintains a steady tension to the drive belt of an accessory drive system are detailed in commonly assigned U.S. Ser. No. 09/442,978, filed Nov. 18, 1999. U.S. Ser. No. 09/442,978 is hereby incorporated by reference as if fully described herein.

The accessory belt tensioner of U.S. Ser. No. 09/442,978 includes a base, an arm and a tensioner pulley. The base is adapted to be fixedly interconnected to the engine. The arm is connected to the base for motion in a first direction and a second direction about an axis. The tensioner pulley is mounted on the arm and adapted to be in a contact relationship with the drive belt such that the drive belt is tightened and loosened in response to movement of the arm in the first and second directions, respectively. The accessory belt tensioner further includes a biasing arrangement and a force resisting arrangement. The biasing arrangement is carried by the base and operates to provide a biasing force to bias the arm to move in the first direction. The force resisting arrangement is carried by the base and provides a resisting force to resist movement of the arm in the second direction. The resisting force has a substantially greater magnitude than the biasing force.

SUMMARY OF THE INVENTION

In one form, the present invention provides a belt tensioner for automatically tightening a belt of a motor vehicle. The belt tensioner includes a tensioner mechanism including a hub, an inner casing and an outer casing. The outer casing is movably mounted to the inner casing. The hub is freely mounted for rotation to the outer casing and for contacting the belt and selectively tightening and loosening the belt in response to movement of the outer casing relative to the inner casing in first and second directions, respectively. The belt tensioner further includes a biasing mechanism for providing a torque force to the outer casing in the first direction. The belt tensioner additionally includes a one-way clutch mechanism normally resisting movement of the outer casing relative to the inner casing in the second direction. An exteriorly accessible rotatably member is associated with the one-way clutch mechanism for selectively deactivating the one-way clutch mechanism to prevent movement of the inner casing in the second direction.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and accompanying drawings, wherein.

DETAILED DESCRIPTION OF THE PREFERRED EMBODIMENT

Figure 1:
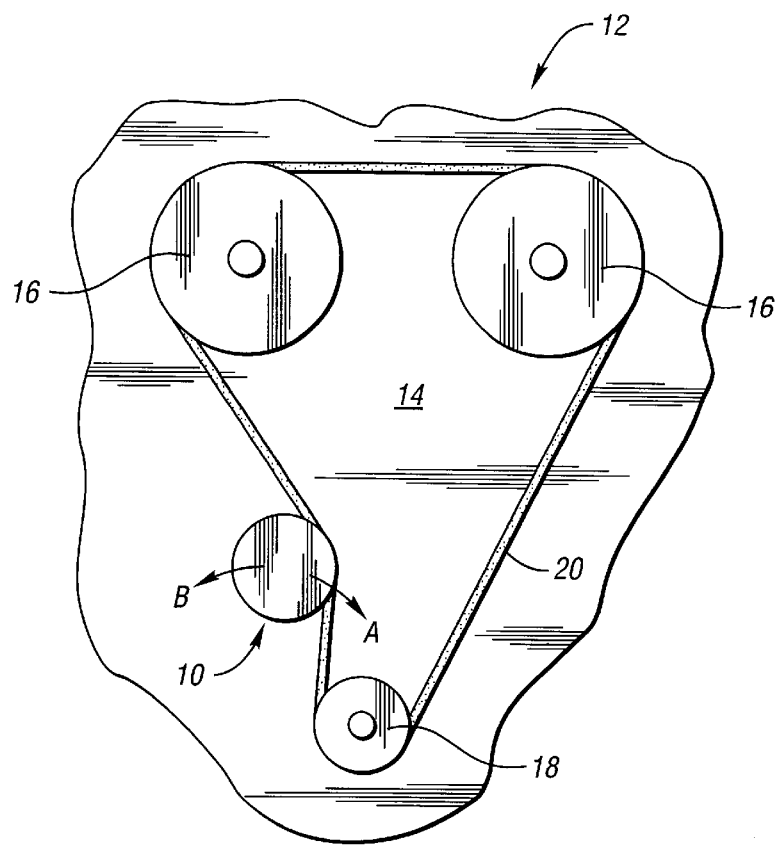
FIG. 1 is a schematic view of a belt tensioner constructed in accordance with the teachings of a preferred embodiment of the present invention shown incorporated into a timing arrangement for a motor vehicle engine.

With reference to FIGS. 1–5, a belt tensioner constructed in accordance with the teachings of a preferred embodiment of the present invention is illustrated and identified at reference numeral 10. The belt tensioner 10 is schematically drawn and incorporated into a timing belt arrangement 12 for a motor vehicle and associated with an engine 14 of the motor vehicle. The engine 14 is illustrated to include a pair of camshaft sprockets 16 and a crankshaft 18. The camshaft sprocket 16 and the crankshaft 18 are rotatably interconnected by a timing belt 20. In a conventional manner, the timing belt 20 functions to synchronize engine timing. As will be discussed further below, the belt tensioner 10 is generally movable in a first direction A for increasing the tension in the timing belt 20 and a second direction B for decreasing the tension in the timing belt 20. Details of the construction of the belt tensioner 10 of the preferred embodiment of the present invention are shown particularly in FIGS. 2 and 3.

The belt tensioner 10 is illustrated to generally include a tensioner mechanism 21 having an inner or stationery casing 22 which is adapted to be suitably interconnected to the engine 14. In the embodiment illustrated, the inner casing 22 is illustrated to define a channel 24 therethrough for receiving a bolt 26. The bolt 26 has a lower end 28 for threadably engaging an aperture 36 formed in the block of the engine 14.

The tensioner mechanism 21 of the belt tensioner 10 of the present invention is further shown to include an outer casing or movable casing 38 and a hub 40. The hub 40 is freely mounted for rotation on the outer casing 38. While not specifically illustrated, it will be understood that suitable bearings may be incorporated between the hub 40 and outer casing 38. The inner casing 22 is offset from the center of the outer casing 38. The longitudinal axis of the bolt 26 defines a rotational axis for the inner casing 22. As further discussed below, the hub 40 contacts the belt 20 and selectively tightens and loosens the belt in response to movement of the outer casing 38 relative to the inner casing 22 in the first direction A and second direction B, respectively.

The belt tensioner 10 further includes means for providing a torque force to the outer casing 38 in the first direction A. In the embodiment illustrated, the torque providing means comprises a biasing mechanism preferably in the form of a spring 42 that is disposed within a chamber 44 defined between the inner and outer casings 28 and 38. The spring 42 is coiled about the inner casing 22 and includes a first end 46 engaging the inner casing 22 and a second end 48 engaging the outer casing 38. The spring 42 functions to bias the outer casing 38 relative to the inner casing 22 in the first direction.

The hub 40 is mounted for relative rotation to the inner hub 38 through a suitable roller bearing 50. The center of the inner casing 22 defines an axis about which the hub 40 rotates. As the outer casing 38 rotates relative to the inner casing 22, the rotational axis for the hub 40 is effectively moved.

The belt tensioner 10 further includes means resisting movement of the outer casing 38 relative to the inner casing 22 in the second direction B. In the embodiment illustrated, the movement resisting means comprises a clutch mechanism 52 which is preferably a one-way clutch mechanism. The clutch mechanism 52 allows movement of the outer casing 38 relative to the inner casing 22 in the first direction A, but prevents relative rotation in an opposite direction. It will be understood by those skilled in the art that any particular construction of a one-way clutch may be incorporated within the present invention.

The clutch mechanism 52 includes a roller 54 and wave spring 56 disposed within a pocket 58 defined between the outer casing 38 and the inner casing 22. A portion of the outer casing 38 defines a ramped surface 60 adjacent the roller 54. The one-way clutch mechanism 52 freely permit rotation of the outer casing 38 in the first direction A (clockwise as shown in the drawings). Rotation of the outer casing 38 in the second direction B (counterclockwise as shown in the drawings) is normally prevented by the clutch mechanism 52. In this regard, counterclockwise movement of the outer casing 38 forces the roller 54 into a reduced width area defined between the inner casing 22 and the ramped surface 60.

The belt tensioner 10 further includes an exterior accessible rotatable member 62 for disabling the clutch mechanism 52 to permit movement of the outer casing 38 in the second direction B. In the embodiment illustrated, the selectively engageable member 62 is a service washer carried by the inner casing 22. The service washer 62 includes a release tab 64 which downwardly extends into pocket 58. A spring 66 having one end secured to the outer casing 38 and another end secured to a radially extending arm 68 of the service washer 62 normally biases the service washer 62 in a clockwise direction.

Figure 2:
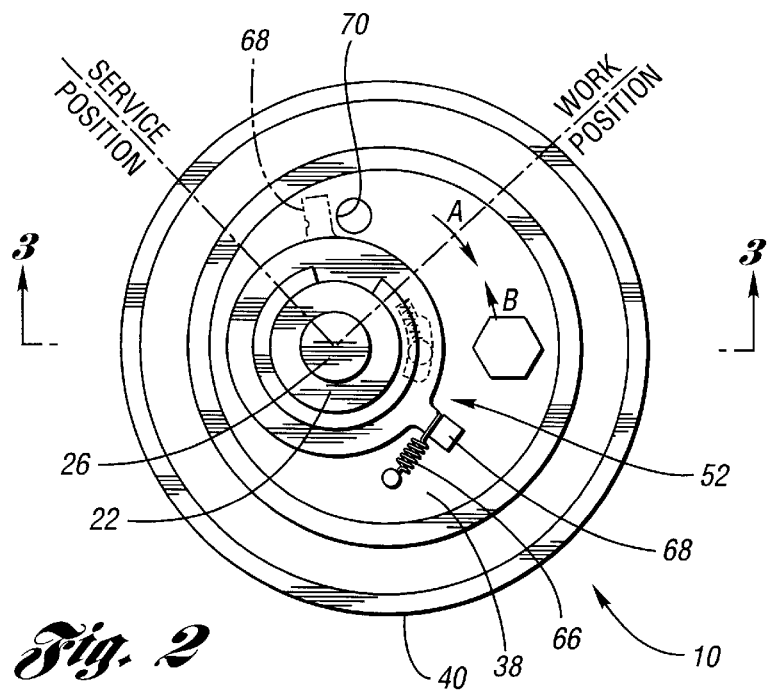
FIG. 2 is a enlarged view of the belt tensioner of FIG. 1.
Figure 3:
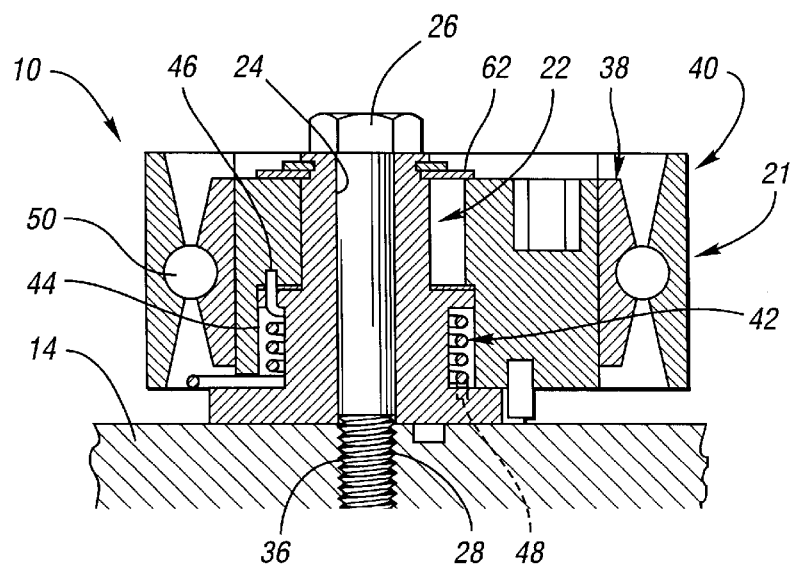
FIG. 3 is a cross sectional top view taken along line 3—3 of FIG. 2.
Figure 4:
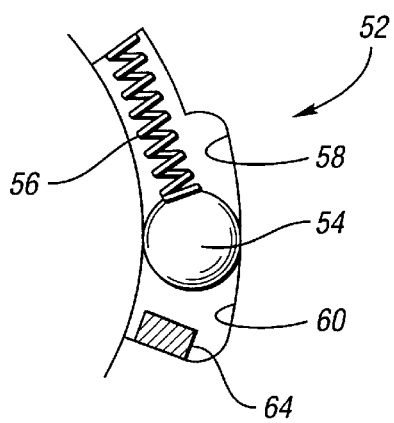
FIG. 4 is an enlarged view illustrating the detail of FIG. 2 shown in phantom.
Figure 5:
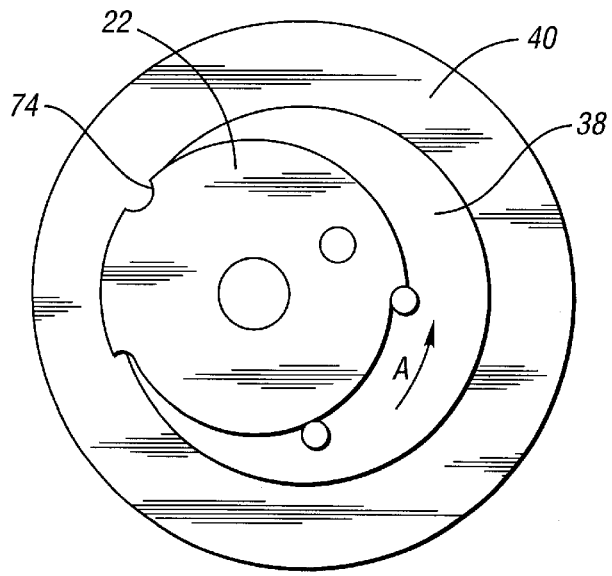
FIG. 5 is a rear view of the belt tensioner.

By rotating the service washer 62 approximately 90° counterclockwise (as shown in FIG. 2 of the drawings) from a work position to a service position, the release tab 64 displaces roller 54 against the bias of its wave spring 56. This action disenables the one-way clutch mechanisms 52. While the service washer 62 is maintained in its service position, the outer casing 38 can be moved in the second direction B. The service washer 62 can be held in the service position by a pin (not shown) inserted into a service hole 70 provided in the outer casing 38. The pin engages a retention slot 74 provided in the outer circumference of the inner casing 22.

In operation, the offset between longitudinally axis of the bolt 26 and the rotational axis of the hub 40 allows the belt tensioner 10 to compensate for slack in the timing belt 20. The spring 42 rotates the movable or outer casing 38 around the stationary or inner casing 22. The hub 40 is supported by the roller bearing 50 and rolls the timing belt 20. As the outer casing 38 moves inward (e.g., in the direction of arrow A), it eventually meets the belt 20 and the hub 40 creates the required tension in the belt 20. During installation of the belt tensioner 10 in an assembly plant or service garage, the belt tensioner 10 is delivered with the service washer 62 in its service position.

Figure 6:
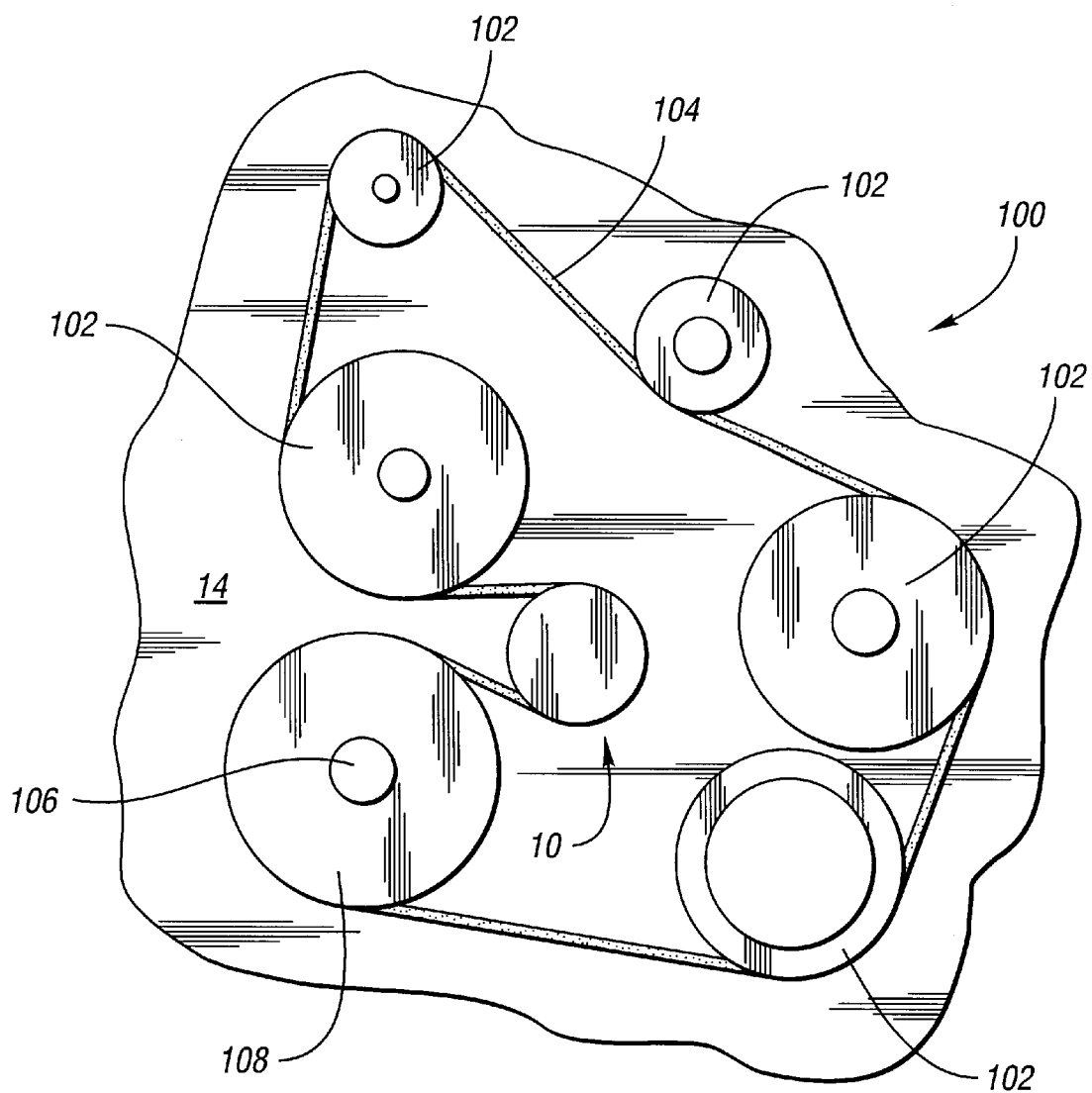
FIG. 6 schematically illustrates the belt tensioner of the present invention shown operatively associated with a plurality of rotating accessories and a continuous drive belt.

Turning now to the schematic diagram of FIG. 6, the belt tensioner 10 of the present invention is shown operatively incorporated into an accessory device system 100 for a motor vehicle and associated with an engine 14 of the motor vehicle. The system 100 includes a plurality of rotating accessories 102 and a continuous drive belt 104. The drive belt 104 is driven by an engine crankshaft 106 through a crankshaft pulley 108. The belt tensioner 10 is attached to the engine 14 with bolts (not specifically shown) as discussed above or by any other suitable manner well known in the art. In a conventional manner, the plurality of rotating accessories 102 may include an alternator, air conditioning compressor, power steering pump, water pump and the like.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A belt tensioner for automatically tightening a belt of a motor vehicle, the belt tensioner comprising:

a tensioner mechanism including a hub, an inner casing and an outer casing, the outer casing movably mounted to the inner casing, the hub freely mounted for rotation to the outer casing and for contacting the belt and selectively tightening and loosening the belt in response to movement of the outer casing relative to the inner casing in first and second directions, respectively;

means for providing a torque force to the outer casing in the first direction;

a one-way clutch mechanism normally resisting movement of the outer casing relative to the inner casing in the second direction; and an exteriorly accessible rotatable member associated with the one-way clutch mechanism for selectively deactivating the one-way clutch mechanism to permit movement of the outer casing in the second direction.

2. The belt tensioner system of a motor vehicle of claim 1, wherein the means for providing a torque force to the outer casing includes a biasing mechanism.

3. The belt tensioner system of a motor vehicle of claim 2, wherein the biasing mechanism is a torsion spring having a first end engaging the inner casing and a second end engaging the outer casing.

4. The belt tensioner system of a motor vehicle of claim 1, wherein the clutch mechanism includes a roller disposed within a pocket defined between the outer casing and the inner casing, the roller biased to a first end of the pocket.

5. The belt tensioner system of a motor vehicle of claim 4, wherein the rotatable member includes a release tab downwardly extending into the pocket.

6. The belt tensioner system of a motor vehicle of claim 1, wherein the belt is an accessory drive belt.

7. The belt tensioner system of a motor vehicle of claim 1, wherein the belt is a timing belt.

* * * * *

UNITED STATES PATENT AND TRADEMARK OFFICE
CERTIFICATE OF CORRECTION

PATENT NO.    : 6,416,435 B1
DATED         : July 9, 2002
INVENTOR(S)   : Szatkowski et al.

It is certified that error appears in the above-identified patent and that said Letters Patent is hereby corrected as shown below:

<u>Title page,</u>
Insert under *Primary Examiner*,
-- *Attorney, Agent, or Firm*: Edwin W. Bacon, Jr. --.

Signed and Sealed this

Twenty-sixth Day of August, 2003

JAMES E. ROGAN
*Director of the United States Patent and Trademark Office*